United States Patent
Heflinger et al.

[11] 3,934,461
[45] Jan. 27, 1976

[54] MULTIPLE EXPOSURE HOLOGRAPHIC INTERFEROMETER METHOD

[75] Inventors: Lee O. Heflinger, Torrance; Ralph F. Wuerker, Palos Verdes Estates; Robert E. Brooks, Redondo Beach, all of Calif.

[73] Assignee: TRW Inc., Redondo Beach, Calif.

[22] Filed: Sept. 16, 1974

[21] Appl. No.: 506,642

Related U.S. Application Data

[63] Continuation of Ser. No. 29,555, April 17, 1970, which is a continuation of Ser. No. 573,115, Aug. 17, 1966.

[52] U.S. Cl. .................................. 73/71.3; 350/3.5
[51] Int. Cl.² ................... G01B 11/16; G01B 9/02
[58] Field of Search .......... 73/67.5 H, 71.3; 350/3.5

[56] References Cited
UNITED STATES PATENTS

| | | | |
|---|---|---|---|
| 3,186,294 | 6/1965 | Woodson | 356/110 |
| 3,548,643 | 12/1970 | Leith et al. | 73/71.3 |
| 3,823,604 | 7/1974 | Burch et al. | 73/71.3 |

OTHER PUBLICATIONS

M. H. Horman, an Application of Wavefront Reconstruction to Interferometry, Applied Optics, Mar. 1965, pp. 333–336.
J. M. Burch, 1965 Viscount Nuffield Memorial Paper, Production Engineer, June 15, 1965 Preprint, 12 pp.
R. E. Brooks et al., Applied Physics Letters, Aug. 15, 1965, pp. 92–94.
R. J. Collier, et al., Applied Physics Letters, Oct. 15, 1965, pp. 223–225.
R. L. Powell, et al., J.O.S.A., Dec. 1965, pp. 1593–1598.
L. H. Tanner, J.S.I., Feb. 1966, pp. 81–83.

*Primary Examiner*—Jerry W. Myracle
*Assistant Examiner*—John P. Beauchamp
*Attorney, Agent, or Firm*—Daniel T. Anderson, Esq.; Edwin A. Oser, Esq.; Jerry A. Dinardo

[57] ABSTRACT

Apparatus and method wherein a photographic plate is doubly exposed by pulsed laser illumination to record successive instants in the history of an object under consideration. The doubly exposed plate is then developed and the photograph or hologram is used to reproduce the object in full three-dimensional detail including subtle changes in the object in the form of interference fringes where the hologram is illuminated with continuous laser illumination.

9 Claims, 6 Drawing Figures

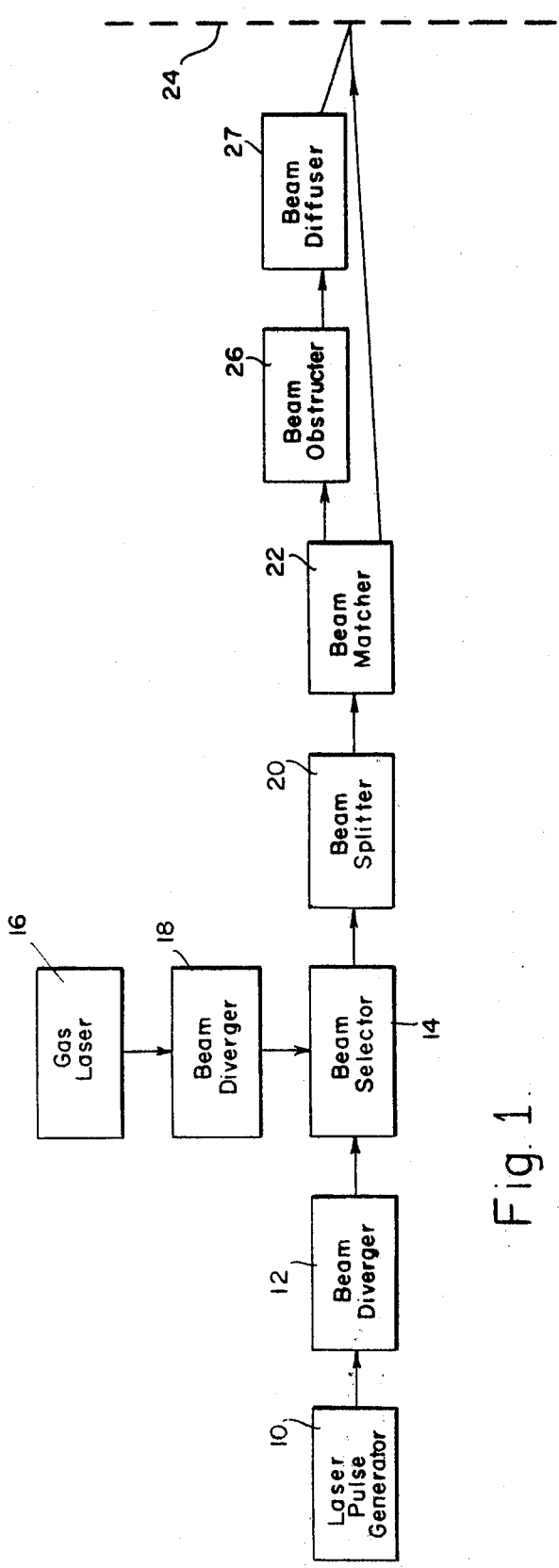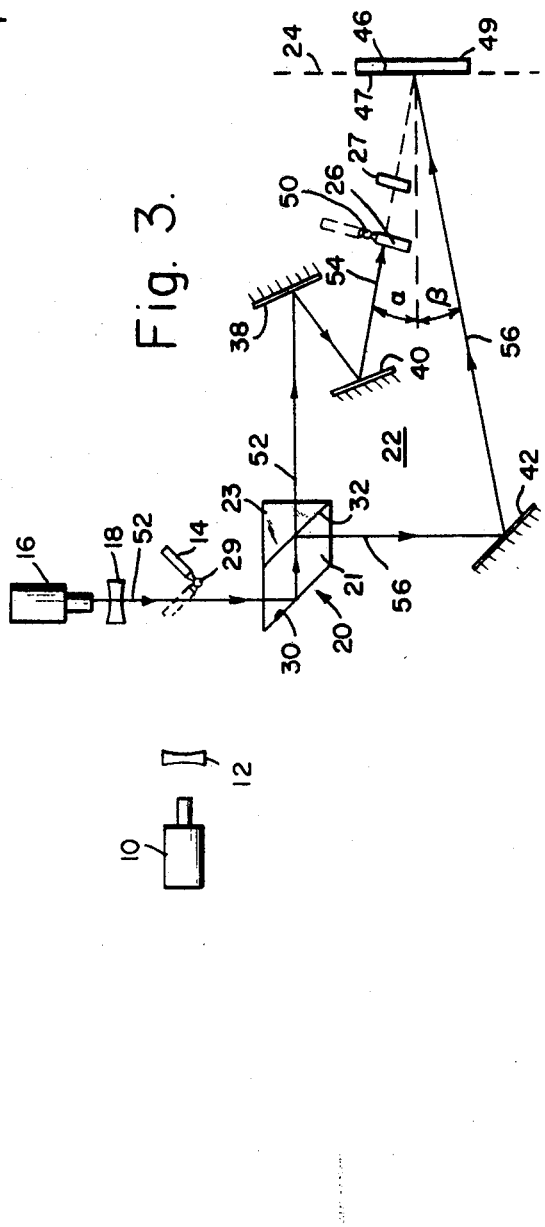

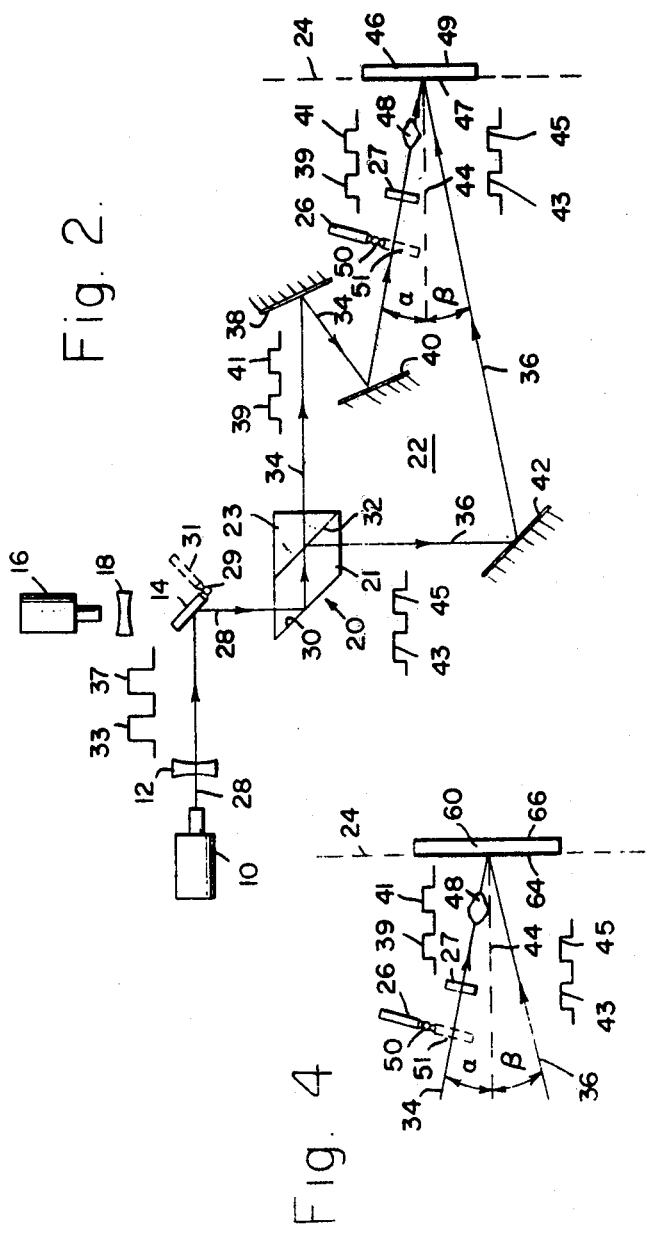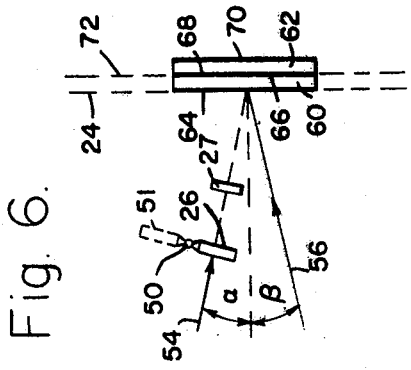

MULTIPLE EXPOSURE HOLOGRAPHIC INTERFEROMETER METHOD

CROSS-REFERENCE TO RELATED APPLICATION

This is a continuation, of application Ser. No. 29,555 filed Apr. 17, 1970, which is a continuation of the copending parent application to Lee O. Heflinger, et al., Ser. Number 513,115, filed on August 17, 1966, and entitled "Multiple Exposure Holographic Interferometer Apparatus and Method".

BACKGROUND OF THE INVENTION

This invention relates generally to holographic apparatus and method and more particularly relates to holographic interferometer apparatus and method capable of producing holograms of objects utilizing multiple exposure photography and reconstructing the holograms so produced.

The usefulness of a hologram lies in its ability to record and completely reconstruct the complex lightwave pattern scattered by an object illuminated by coherent radiant energy. In contrast to the limited object representation of a conventional photograph, the completeness of the hologram reconstruction allows observations to be made on the reconstructed waves in the same way they would be made on the waves scattered from the real object. In an optical sense, the hologram provides the closest substitute for having the real object itself available for examination. This becomes extremely important when the object is moving or changing too fast to make direct observations of it.

SUMMARY OF THE INVENTION

Briefly, in accordance with one aspect of the invention there is provided novel method whereby a high resolution photographic plate doubly exposed by laser illumunation is used to record successive instants in the history of an object. After the doubly exposed plate is developed, the resulting laser photograph or hologram, when illuminated by laser illumunation on one side, is used to reproduce the object in full three-dimensional detail including subtle changes in the object in the form of interference fringes.

BRIEF DESCRIPTION OF THE DRAWINGS

In the drawings:

FIG. 1 is a block diagram illustration of the apparatus of the invention;

FIG. 2 is a schematic diagram of the apparatus of FIG. 1 illustrating the arrangement of parts utilized in the making of one type of hologram in accordance with the teachings of the invention;

FIG. 3 is a schematic diagram of the apparatus of FIG. 1 illustrating the arrangement of parts utilized in the viewing of holograms produced by the arrangement of FIG. 2;

FIGS. 4 and 5 are similar showings of a portion of the arrangement of FIG. 2 illustrating the making of another type of hologram in accordance with the invention; and FIG. 6 is a showing of a portion of the arrangement of FIG. 3 illustrating the viewing of holograms produced by the arrangement of FIGS. 4 and 5.

DESCRIPTION OF THE PREFERRED EMBODIMENTS

Referring to the drawings and in particular to FIG. 1 wherein the numeral 10 designates a solid state laser pulse generator capable of generating a beam of pulses of coherent light energy. The beam of light energy generated by the laser illuminator 10 is passed through a beam diverger 12 to a beam selector 14. A gas laser designated by the numeral 16 serves to produce a beam of coherent continuous light energy which is directed through another beam diverger 18 to the beam selector 14. Beam selector 14 serves to select either the beam generated by generator 10 or the beam generated by the gas laser 16 and passes the selected beam to a beam splitter 20. The beam splitter 20 splits the selected beam into a pair of beams and passes them to a beam matcher 22, which temporally and spatially matches the beams at a plane 24. A beam obstructor 26 is adapted for selective positioning in the path of one beam to obstruct passage of light to the plane 24. A beam diffuser 27 is positioned in the one beam.

Referring now to FIG. 2 wherein the apparatus of FIG. 1 is illustrated in greater detail for use in the making of holograms of one type in accordance with the invention, the laser pulse generator 10 could be a conventional "Q-switched" solid state laser pulse generator. Pulse generator 10 is preferably adapted to generate a pulsed beam 28 consisting of a pair of consecutive pulses 33 and 37 of coherent oscillatory light energy, with each pulse having a time duration of about 60 nanoseconds and an energy per pulse of the order of 3 joules.

The beam diverger 12 is preferably a negative lens which is constructed thinner at the center than at the rim such that the rays of the beam 28 which pass therethrough on the way to the beam selector 14 are outwardly diverged.

Beam selector 14 is a mirror suitably mounted on a support (not shown) as by a pivot 29 for selective positioning. The mirror 14 can either be swung into one position, as shown, to intercept and direct the beam 28 along the path illustrated to the beam splitter 20, or it can be swung into the indicated dashed line position 31 out of the beam 28, if preferred, or for a purpose to be hereinafter more clearly explained.

The gas laser 16 is preferably a helium-neon continuous gas laser capable of generating a beam of continuous coherent light for a purpose to be hereinafter more clearly set forth. The beam diverger 18 can be of similar construction as the beam diverger 12 and serves to diverge the rays of the beam produced by laser 16.

Beam splitter 20 is illustrated as consisting of portions 21 and 23, the portion 21 having a rhomboidal cross section and fashioned from transparent material such as glass, or the like, with a totally silvered surface 30 which reflects the beam 28 toward a beam splitting surface 32. Surface 32 is partially silvered so that the beam 28 is split into a pair of beams, the first or scene beam 34 consisting of a pair of pulses 39 and 41 which pass through the surface 32, and the second or reference beam 36 consisting of a pair of corresponding pulses 43 and 45 which are reflected from the surface 32. The pulses 39, 41, 43 and 45 are substantially equal in intensity to each other and are equal to one-half the intensity of pulses 33 and 37. The portion 23 of the beam splitter is a 45° - 45° - 90° prism fashioned from the same transparent material as the portion 21 and serves to prevent the beam 34 from passing obliquely from one medium to another thus eliminating refraction of the beam.

The beam matcher 22 for use in the methods and apparatus of the invention could be any conventional beam matcher. One such beam matcher is illustrated in FIGS. 2 and 3 and briefly consists of normally fixed mirrors 38, 40, and 42 which serve to recombine the two split beams 34 and 36 at the film plane 24. The mirrors 38, 40 and 42 are so arranged and positioned that the two beams 34 and 36 undergo the same number of reflections along substantially equal optical path lengths in traveling from the beam splitting surface 32 to the plane 24 which provides a superposition of the two beams 34 and 36 at the plane 24 matched both in space and time. Preferably, the mirrors 38, 40, and 42 are also arranged so that the two beams 34 and 36 form substantially equal angles $\alpha$ and $\beta$, respectively, with a plane 44 positioned normal to the plane 24.

A photographic plate 46 preferably fashioned from glass and having a light sensitive emulsion surface 47 and an opposite surface 49 is adapted for positioning such that the emulsion surface 47 lies in the plane 24. A photographic plate which is suitable is a high resolution photographic plate such as the Eastman Kodak type 649-F. An object 48, to be photographed, may be placed in the beam 34, as shown.

The beam obstructor 26 can be in the form of a solid plate member which is preferably mounted as by a pivot 50 on a structure (not shown) for selective positioning such that it can be moved either into one position, as shown, in order not to interfere with the passage of beam 34, or it can be swung into the dashed line position 51 to obstruct passage of the beam 34, as desired. Preferably the beam obstructor 26 is opaque and impervious to the transmission of the light energy generated by the gas laser 16 when in the position 51.

The beam diffuser 27 is a plate of ground glass adapted for positioning in the beam 34 whereby illumination of an object to be photographed positioned in the beam can be obtained over wider angles thus providing perspective and three dimensional characteristics to the reconstructed image of the object.

In operation, with the beam selector 14 and the beam obstructor 26 positioned in the positions as shown in FIG. 2, one type of hologram or interferogram of transient events by means of holographic recording can be obtained. First, a comparison scene is recorded on the plate 46. This comparison scene may be nothing more than the object space which is subsequently disturbed. Thus the object space may consist of the undisturbed air which is subsequently disturbed by the passage of a bullet which generates a shock wave, hence creating a disturbed object space. Or the comparison scene can be the object 48 itself in some initial position or condition. Assuming now that the object space is initially undisturbed, a comparison scene under these conditions is produced by first exposing the emulsion surface of the plate 46 to the beams 34 and 36 during the generation of the first pulse 33. This exposure produces the first latent image photographic record on the plate 46 and is a record of the interference pattern formed by the beams 34 and 36. If now the object space is disturbed during the generation of the second pulse 37 of the beam 28, a second latent image photographic record or test scene is made on the same plate 46. This second record is also an interference pattern between the beams 34 and 36 but manifest changes in the optical path length traveled by the beam 34 resulting from the disturbance of the object space into the beam 34. Thus, two records in the form of interference patterns setting forth two instants in the history of the object space, are superposed on the single photographic plate 46.

Interferometric photography can also be realized with the arrangement of FIG. 2 by simply causing the object 48 to be present in the beam 34 during the generation of both pulses 33 and 37 of beam 28. In this manner any changes in the object 48 between the generation of the two pulses 33 and 37 can also be interferometrically recorded on the same plate 46. The latent image photographic records thus produced on the plate 46, as set forth above, are then converted to visible images on the glass plate simply by developing the plate 46 with a suitable developer agent such as Kodak HRP, or the like, to produce a hologram.

Reference is now made to FIG. 3 wherein an arrangement of parts is shown whereby viewing of holograms produced by the arrangement of FIG. 2 can be accomplished. It is to be noted that the selector 14 and the beam obstructor 26 have been moved to the positions 31 and 51, respectively of FIG. 2. Preferably after the plate 46 has been doubly exposed and developed, it is carefully replaced so that the emulsion surface 47 of the plate occupies substantially the same position in the plane 24 that it occupied when the plate 46 was doubly exposed. The plate 46 is then illuminated on one side by a laser beam that occupies the same geometrical position that was occupied by the reference beam 36 during the recording of interferometric patterns with the arrangement of FIG. 2. This illumination can be obtained by arranging the laser 16 such that its output beam 52 is directed along the same path that the beam 28 was directed toward the beam splitter 20 by the beam selector 14 when it occupied the position shown in FIG. 2. The beam 52 is split into a pair of beams by the surface 32, the first beam 54 and the second beam 56 corresponding to and located in the same geometrical positions as the beams 34 and 36 in the arrangement of FIG. 2, respectively. As in the case of beams 34 and 36 with the beam obstructor 26 positioned as shown in FIG. 2, the beams 54 and 56 would normally be superposed at the plane 24 matched both in space and time. But with the obstructor 26 positioned in the position 51 only the beam 56 arrives at the plane 24 to illuminate the plate 46 on the one side 47. Observation through the plate 46 from the opposite side 49 reveals the reconstruction image of the object 48 complete with interference patterns. The reconstructed image of the object 48 can thus be examined at leisure or photographed from different angles since the image is three dimensional.

FIGS. 4 and 5 illustrate the making of a composite type of hologram which consists of effecting multiple exposures of separate photographic plates 60 and 62. As in the previous embodiment a plate 60 having an emulsion surface 64 and an opposite surface 66 is first positioned with its emulsion surface 64 located within the plane 24. As before, with the object space undisturbed, a first exposure of the plate 60 is made during the generation of a first pulse 33 of the beam 28 to produce a comparison scene latent image record. The plate 60 is then removed from its position and a plate 62 having an emulsion surface 68 and an opposite surface 70 is positioned with the emulsion surface 68 in a plane 72, as shown in FIG. 5. The plane 72 is substantially parallel to and separated from the plane 24 by a distance equal to the thickness of the plate 60. Preferably the plate 62 is positioned so as to be in alignment with the dashed rear line position 74 previously occupied by the surface 66 of the plate 60. In other words, each of the plates 60 and 62 should occupy the same location during exposure that it will occupy during reconstruction. If now the object space is disturbed during the generation of the second pulse 37, a second latent image record is made on the plate 62. It is to be appreciated that the object 48 could be present in the beam 34 during the generation of both pulses 33 and 37 with the result that an interferometric record of any changes in the object 48 between generation of the two pulses 33 and 37 would be recorded on a separate plate 62. The two plates 60 and 62 are then developed and the latent images converted to visible images to produce a composite hologram consisting of the plates 60 and 62.

To view the object 48 and the interference pattern the two plates 60 and 62 are positioned in precisely the same locations occupied during exposure and simultaneously reconstructed by the beam 56 formed as hereinbefore described as shown in FIG. 6. The reconstructed wave patterns from the composite holograms interfere producing an interference pattern which can thus be viewed or photographed. One advantage of having separate exposures on separate plates 60 and 62 is that either finite or infinite fringe patterns can be produced by slightly shifting the alignment of the plates during reconstruction. The finite and infinite fringe technique is quite well known and has been used in the past in connection with standard Mach-Zehnder interferometry.

Several possible alternate modifications and variations of the present invention will be apparent to those skilled in the art. For example, a sequence of many photographs documenting successive changes in an object can be made. Each of these photographs may then be compared with a single reference photograph to observe the successive changes in the interference pattern. By proper arrangement of the photographs it would be possible to not only compare each photograph to the reference photograph but also to compare any one photograph to any other photograph, which provides a high degree of flexibility in differential interferometry.

What is claimed is:
1. A method comprising the steps of:
a. generating a pulsed laser energy beam;
b. splitting said laser energy beam into a pair of beams;
c. directing one of said pair of beams through an unperturbed object space;
d. superposing said pair of beams;
e. exposing radiation sensitive material to said pair of superposed beams during generation of one pulse of said pulsed laser energy beam to make an image record;
f. exposing radiation sensitive material to said pair of superposed beams during generation of another pulse of said pulsed laser energy beam to make another image record;
g. directing one of said pair of beams during generation of one of said pulses through a perturbed object space;
h. processing said radiation sensitive material to convert said image records to visible images to form a hologram;
i. generating a continuous laser energy beam;
j. splitting said continuous laser energy beam into another pair of beams;
k. superposing said other pair of beams to occupy positions corresponding to positions occupied by said pair of beams;
l. obstructing the beam of said other pair of beams corresponding to said one beam wherein said object space was positioned; and
m. positioning said hologram for viewing in the other beam of said pair of beams in the same position occupied by said radiation-sensitive material when exposed.

2. In the method set forth in claim 1 wherein the step of exposing radiation sensitive material to said pair of superposed beams during generation of another pulse of said pulsed laser energy beam comprises:
exposing the same radiation sensitive material exposed during generation of said one pulse in one plane.

3. In the method set forth in claim 1 wherein the step of exposing radiation sensitive material to said pair of superposed beams during generation of another pulse of said pulsed laser energy beam comprises:
exposing radiation sensitive material other than that exposed during generation of said one pulse in another plane.

4. The method of performing holographically interferometric measurements in transmission of an object space comprising:
a. generating a coherent beam of radiant energy;
b. splitting said energy beam into a first and a second beam;
c. directing one of said beams toward a predetermined plane and the other beam to fall on said plane;
d. exposing during a first time radiation-sensitive material disposed in said plane to light from said beams for a predetermined length of time to produce a holographic record;
e. exposing during a second time radiation-sensitive material disposed in said plane to light from said beams for a predetermined length of time to produce another holographic record;
f. passing one of said first and second beams through an object space, the object space being at least partially transparent to said beams and being perturbed during one of said times to provide a record of the perturbations of the transparent object space thereby to permit interferometric measurements; and
g. scattering said one of said first and second beams ahead of the object space by a radiant energy diffuser.

5. The method as defined in claim 4 wherein the holographic record is subsequently illuminated by a beam of light for reconstructing an image of the transparent object space previously recorded.

6. The method as defined in claim 4 wherein the same radiation-sensitive material is exposed during said first and second time.

7. The method of performing holographically interferometric measurements in transmission of an object space which comprises the steps of:
a. generating a beam of laser light;

b. splitting said laser beam into an object and a reference beam;
c. directing said reference beam toward a predetermined plane and said object beam to fall on said plane;
d. passing said object beam through an object space, said object space being at least partially transparent to said object beam;
e. scattering the light of said object beam ahead of the object space by a light diffuser;
f. exposing a radiation-sensitive material disposed in said plane to light from said object and reference beams for a predetermined period of time to generate a holographic record;
g. exposing a radiation-sensitive material in the same position to light from said object and reference beams at a later time for a predetermined period of time to generate another holographic record;
h. passing said object beam again through the transparent object space; and
i. distorting the object space during one of said exposures, whereby inspection of the reconstructed holographic image obtained from the radiation-sensitive material will permit interferometric measurements of changes of the object space.

8. A method of measuring small dimensional changes through an object space by hologram interferometry in transmission, comprising the steps of:
a. illuminating an object space in first and second conditions to form first and second transmitted object beams respectively, the object space being at least partially transparent to said object beams;
b. generating a reference beam;
c. scattering the object beams ahead of the object space by a beam diffuser;
d. combining said first transmitted object beam with said reference beam and said second transmitted object beam with said reference beam to form individual first and second interference patterns respectively; and
e. recording said first and second interference patterns to detect any differences in said interference patterns as a measure of perturbations in the transparent object space.

9. A method according to claim 8 in which after an exposure of a photosensitive medium to produce a hologram corresponding to said first condition at least one fresh exposure is made under at least said second condition before the photosensitive medium is processed, whereby a multiple hologram is produced which records diffraction patterns of at least two forms of the transparent object space and a pattern of fringes corresponding to the perturbations of the object space.

* * * * *